US009938158B2

(12) United States Patent
Ozaki et al.

(10) Patent No.: US 9,938,158 B2
(45) Date of Patent: Apr. 10, 2018

(54) HEMATITE MANUFACTURING PROCESS AND HEMATITE MANUFACTURED BY SAME

(71) Applicant: SUMITOMO METAL MINING CO., LTD., Tokyo (JP)

(72) Inventors: Yoshitomo Ozaki, Ehime (JP); Hideki Ohara, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/898,710

(22) PCT Filed: May 15, 2014

(86) PCT No.: PCT/JP2014/062989
§ 371 (c)(1),
(2) Date: Dec. 15, 2015

(87) PCT Pub. No.: WO2014/203661
PCT Pub. Date: Dec. 24, 2014

(65) Prior Publication Data
US 2016/0137524 A1 May 19, 2016

(30) Foreign Application Priority Data
Jun. 17, 2013 (JP) ................................. 2013-126805

(51) Int. Cl.
*C01G 49/06* (2006.01)
*C01F 11/00* (2006.01)
(Continued)

(52) U.S. Cl.
CPC ............ *C01G 49/06* (2013.01); *C01B 17/501* (2013.01); *C01B 17/96* (2013.01); *C01F 5/12* (2013.01);
(Continued)

(58) Field of Classification Search
CPC ........ C02F 1/5236; C02F 1/66; C02F 1/2101; C02F 1/206; C01B 17/96; C01F 11/00; C01F 11/468
See application file for complete search history.

(56) References Cited

U.S. PATENT DOCUMENTS 3,055,734 A * 9/1962 Pomykala ................ C01D 3/06
205/619
3,099,528 A * 7/1963 Hadzeriga ............. C01B 17/745
159/903
(Continued)

FOREIGN PATENT DOCUMENTS

AU 2008201762 A1 * 11/2008 ............. C01C 1/026
CN 101 356 291 A 1/2009
(Continued)

OTHER PUBLICATIONS

Jul. 22, 2014 International Search Report issued in International Patent Application No. PCT/JP2014/062989.
(Continued)

*Primary Examiner* — Melissa S Swain
(74) *Attorney, Agent, or Firm* — Oliff PLC

(57) ABSTRACT

Magnesium oxide produced by a process is used as a neutralizing agent for preliminary neutralization treatment of a leached slurry obtained by leaching a nickel oxide ore at a high temperature and pressure with sulfuric acid added. A neutralizing agent is added to a leachate, obtained by leaching a nickel oxide ore, to separate impurities, and a sulfurizing agent is added to the resulting neutralized solution to obtain nickel and cobalt sulfides, followed by separating the sulfurized solution; discharge waste water, obtained by adding a neutralizing agent to the sulfurized solution to separate aluminum and manganese, is concentrated to precipitate and separate calcium contained in the discharge waste water as calcium sulfate; the resulting (Continued)

solution is concentrated to precipitate magnesium in the solution as magnesium sulfate; the magnesium sulfate is roasted with a reducing agent to obtain magnesium oxide and a sulfurous gas; and the magnesium oxide is washed.

8 Claims, 6 Drawing Sheets

(51) Int. Cl.

| | | |
|---|---|---|
| C02F 1/52 | (2006.01) | |
| C02F 1/66 | (2006.01) | |
| C01F 11/46 | (2006.01) | |
| C01B 17/96 | (2006.01) | |
| C01F 5/12 | (2006.01) | |
| C22B 3/00 | (2006.01) | |
| C01F 5/40 | (2006.01) | |
| C01B 17/50 | (2006.01) | |
| C02F 101/20 | (2006.01) | |

(52) U.S. Cl.
CPC ............... *C01F 5/40* (2013.01); *C01F 11/00* (2013.01); *C01F 11/46* (2013.01); *C01F 11/468* (2013.01); *C02F 1/5236* (2013.01); *C02F 1/66* (2013.01); *C22B 23/043* (2013.01); *C22B 23/0461* (2013.01); *C01P 2002/72* (2013.01); *C01P 2004/02* (2013.01); *C02F 2101/206* (2013.01)

(56) References Cited

U.S. PATENT DOCUMENTS

| | | | | |
|---|---|---|---|---|
| 4,225,573 A | * | 9/1980 | Kobayashi | ................ C01F 5/12 423/638 |
| 4,298,379 A | | 11/1981 | Zambrano | |
| 4,541,868 A | * | 9/1985 | Lowenhaupt | .......... C01G 51/10 423/140 |
| 4,697,744 A | * | 10/1987 | Wada | ..................... C01G 49/02 209/164 |
| 7,559,972 B2 | * | 7/2009 | Liu | ..................... C22B 23/0461 75/743 |
| 2008/0025892 A1 | * | 1/2008 | Roche | ....................... C01F 5/06 423/158 |
| 2009/0148366 A1 | * | 6/2009 | Roche | .................. C01B 17/501 423/170 |

FOREIGN PATENT DOCUMENTS

| | | | | |
|---|---|---|---|---|
| EP | 1731622 A1 | * | 12/2006 | ............... C22B 3/08 |
| EP | 3 009 407 A1 | | 4/2016 | |
| EP | 3 048 083 A1 | | 7/2016 | |
| JP | S50-110901 A | | 9/1975 | |
| JP | S57-500021 A | | 1/1982 | |
| JP | S61-97135 A | | 5/1986 | |
| JP | H06-279881 A | | 10/1994 | |
| JP | 2000-093739 A | | 4/2000 | |
| JP | 2005-523996 A | | 8/2005 | |
| JP | 2005-350766 A | | 12/2005 | |
| JP | 2007077459 A | * | 3/2007 | |
| JP | 2009-102742 A | | 5/2009 | |
| JP | 2009-520661 A | | 5/2009 | |
| JP | 2010-095788 A | | 4/2010 | |
| JP | 2011-206757 A | | 10/2011 | |
| WO | WO 8102153 A1 | * | 8/1981 | ............... C01F 5/12 |
| WO | WO 2010103913 A1 | * | 9/2010 | ............... C02F 1/74 |
| WO | WO 2013027603 A1 | * | 2/2013 | .......... C22B 23/043 |
| WO | 2013/094530 A1 | | 6/2013 | |

OTHER PUBLICATIONS

Mar. 28, 2017 extended European Search Report issued in Application No. 14814192.2.

\* cited by examiner

HEMATITE MANUFACTURING PROCESS AND HEMATITE MANUFACTURED BY SAME

BACKGROUND OF THE INVENTION

Field of the Invention

The present invention relates to a process for producing hematite in which low-sulfur-grade hematite usable as, for example, an iron-making raw material is produced from leached residue generated when a nickel oxide ore is leached under pressure, and the hematite. The present application claims priority on the basis of Japanese Patent Application No. JP 2013-126805 filed on Jun. 17, 2013 in Japan, and this application is incorporated herein by reference.

Description of Related Art

A nickel oxide ore contains various components such as iron, cobalt and manganese in addition to nickel. In smelting for recovering nickel from the nickel oxide ore, a process called fire smelting has been often used in which an oxide ore is placed in a furnace and roasted together with a reducing agent.

In fire smelting, components that are not to be recovered, such as iron, manganese, aluminum and magnesium, are effectively separated from nickel and cobalt as a slug.

In recent years, a hydrometallurgical process called a HPAL process has also been used in which a low-grade nickel oxide ore that contains only about 1 to 2% by mass of nickel and cannot be economically smelted by the fire smelting process is placed in a pressurized vessel together with sulfuric acid, valuable metals such as nickel and cobalt are leached into the sulfuric acid solution under an atmosphere with a high temperature of about 250° C. and a high pressure, and separated from leached residue.

As described in, for example, Patent Literature 1, nickel and cobalt leached in the HPAL process are solid-liquid-separated from a slurry while remaining free acids are neutralized by adding a neutralizing agent, and a neutralizing agent is then added to separate the nickel and cobalt from impurities. Further, a sulfurizing agent is added to the leached nickel and cobalt to recover the nickel and cobalt in the form of a sulfide as an intermediate raw material, so that the nickel and cobalt are separated from impurity components such as aluminum, manganese and magnesium which remain in the sulfurized solution and are not to be recovered. The sulfurized solution containing these impurity components is then neutralized by adding a neutralizing agent thereto, and thereby forms waste water precipitates composed of the impurity components. The resulting waste water precipitates are mixed with leached residue, or individually deposited on a tailing dam to be treated.

On the other hand, the smelting process using a wet process has the problem that a larger amount of leached residue are generated with respect to the same nickel production amount because the nickel grade is low. The majority of leached residue are mainly composed of iron, and exist in the form of iron oxide ($Fe_2O_3$) called hematite particularly in the case of the above-mentioned HPAL process. Hematite is a type of iron ore, and therefore it is preferred that leached residue in the HPAL process are essentially provided as an ironmaking raw material to effectively use a resource and reduce the amount of wastes.

However, leached residue obtained in the HPAL process have not used because they are considered unsuitable for ironmaking applications.

This is because a large amount of a neutralizing agent is required for a neutralizing free acids sticking in a leachate in the case of practical operations for recovering nickel from a nickel oxide ore on an industrial scale. Specifically, in neutralization of free acids sticking in a leachate, a calcium-based neutralizing agent such as slaked lime or limestone, which can be easily and relatively inexpensively acquired on an industrial scale, is often used, but when the calcium-based neutralizing agent is used, calcium sulfate (gypsum) generated in neutralization also coexists as precipitates in leached residue, and therefore the grades of sulfur and calcium coexisting in hematite increase.

Particularly, when leached residue include sulfur, and are used as an ironmaking raw material in an ironmaking process, the sulfur may be discharged as a $SO_2$ gas to the surroundings to cause destruction of the environment in the case of a blast furnace which does not have effective desulfurization equipment. Accordingly, specifically it has been required to reduce the content of sulfur in hematite to approximately 1% or less. Existence of calcium in iron steel may also affect the quality, and therefore the content of calcium is preferably low.

Accordingly, it may be practical to use a non-calcium-based neutralizing agent, for example sodium hydroxide. However, a neutralizing agent such as sodium hydroxide is not suitable for practical use in terms of cost when considering the industrial use scale.

Thus, a process has been devised in which a salt having a high solubility is used as a neutralizing agent to prevent a neutralized product from being caught in leached residue. Specifically, magnesium salts such as magnesium oxide and magnesium hydroxide are suitable for this use purpose. Further, there is a large amount of magnesium around or in a nickel oxide ore, and accordingly magnesium may be inexpensively and stably supplied.

Specifically, for example, Patent Literature 2 describes one of processes for recovering magnesium from a solution sent to a waste water treatment. Patent Literature 2 suggests a process for recovering magnesium oxide from a source of magnesium sulfate, the process including the steps of: providing a source of solution-state magnesium sulfate which is obtained from a part of a process related to leaching of a metal-containing ore or smelted ore; transforming the solution-state magnesium sulfate into solid magnesium sulfate; bringing the solid magnesium sulfate into contact with elemental sulfur in a reducing atmosphere; and recovering magnesium as magnesium oxide and sulfur as a sulfur dioxide gas.

In the process in Patent Literature 2, however, a process is used in which for recovering crystals of magnesium sulfate from waste water freed of a valuable substance such as nickel, the magnesium sulfate is brought into contact with concentrated sulfuric acid produced from a sulfur dioxide gas, thereby performing crystallization and dehydration. In this case, magnesium remaining without being crystallized is subjected to a leaching step again together with sulfuric acid, so that the magnesium crystallization amount depends on the amount of sulfuric acid used for leaching, and therefore it is not easy to maintain a balance. There is the problem that the degree of freedom of operations is restricted particularly when magnesium is to be separated and used as a neutralizing agent.

Patent Literature 3 suggests a leaching process for recovering nickel and cobalt from a laterite ore, the process including the steps of: separating the laterite ore into a low-magnesium-content ore fraction and a high-magnesium-content ore fraction by selective mining or post-fractionation; individually slurrying the separated ore fractions; leaching the low-magnesium-content ore fraction with concentrated sulfuric acid as a primary leaching step; and introducing a high-magnesium-content ore slurry subsequently to completion of the primary leaching step and precipitation of iron as other low-sulfur-content form of goethite, iron oxide or iron hydroxide, and leaching the high-magnesium-content ore fraction with sulfuric acid released in the iron precipitate as a secondary leaching step.

It is also considered that by using a process as described above, magnesium contained in a nickel oxide ore can be used as a neutralizing agent, or magnesium can be recovered from a neutralized solution and used as a neutralizing agent repeatedly, and as a result, leached residue capable of being provided for a low-calcium-content ironmaking raw material are obtained.

When such a process is used, however, enormous heat energy is required in concentration of magnesium from a large amount of waste water, and impurities contained in the ore are accumulated in the process as the neutralizing agent is repeatedly used.

Further, normally the grade of magnesium contained varies depending on the type, and mining location and period of an ore, and is thus unstable. Accordingly, if there is a shortage of magnesium, a conventional calcium-based neutralizing agent such as slaked lime or limestone, which is inexpensive and can be stably supplied, may be used in combination. In this case, however, calcium is brought in the process and circulated in the process system as in the case of the conventional process described above. When magnesium is to be recovered from waste water, a part of calcium exhibits the same behavior as that of magnesium to be contaminated, and therefore magnesium can no longer be used for applications other than a neutralizing agent.

As a process for separating magnesium and calcium in a solution, mention is made of, for example, a process shown in Patent Literature 4. According to the process described in Patent Literature 4, in a stack-gas desulfurization plant using magnesium hydroxide as a desulfurizing agent, magnesium hydroxide is recovered from waste liquid discarded/discharged and containing a large amount of magnesium sulfate, and circulated to a stack-gas desulfurization step to contribute to recycling and environmental cleanup.

Specifically, ammonia is added to stack-gas desulfurization waste water containing magnesium sulfate to generate and precipitate magnesium hydroxide, milk of lime is added to the left liquid to generate calcium sulfate and ammonia, and the ammonia is circulated in the process. The magnesium hydroxide thus obtained is slurried with a main process final waste liquor, and circulated to the desulfurization plant to completely circulate desulfurization plant waste water, so that waste water can be prevented from being discarded/discharged. The advantage of the resulting calcium sulfate in direct sale can be improved by providing a washing step to improve the purity thereof.

However, the process in Patent Literature 4 has the problem that since ammonia is handled, complicated equipment is required, leading to an increase in investment and operation costs, etc. and thus it is difficult to readily employ the process.

When magnesium hydroxide and magnesium oxide are produced from magnesium components contained in a nickel oxide ore, and used as a neutralizing agent as described above, an increase in costs as compared to limestone and slaked lime, and thus it is not practical to depend only on a water-soluble neutralizing agent. Further, there may be influences of calcium components etc. contained in the ore or impurities treated together.

In this connection, Patent Literature 5 describes a process for preparing magnesium oxide from a metal sulfate solution containing magnesium sulfate and calcium. In this process, metals other than magnesium are precipitated as hydroxides to separate a solid and a liquid, the separated solution is concentrated so as to have a specific gravity of 1.35 to 1.5, so that calcium sulfate is separated, and magnesium sulfate is recovered from the solution after the separation, and thermally decomposed to recover magnesium oxide.

However, the process in Patent Literature 5 has the problem that when concentration is performed for separating calcium sulfate, a part of magnesium is simultaneously precipitated together with calcium, leading to deterioration of recovery efficiency. This is because in precipitation of a compound of calcium sulfate dihydrate, precipitation of magnesium sulfate heptahydrate starts to occur in parallel, and separation of the former from the latter can be performed by various processes such as a process in which components of the solution are analyzed, a process in which a difference in appearance is observed by naked eyes, and a process in which the specific gravity is measured, but a great deal of labor and time is required.

Thus, in the conventional processes, it is not easy to inexpensively and efficiently produce magnesium oxide having a low impurity grade and a high purity, and it is difficult to stably obtain hematite, which has a low sulfur grade and calcium grade (specifically, the sulfur grade and the calcium grade are each 1% by weight or less) and is suitable as an ironmaking raw material, from a HPAL process of a nickel oxide ore using the magnesium oxide as a neutralizing agent.

Patent Literature 1: Japanese Patent Application Laid-Open No. 2005-350766

Patent Literature 2: Japanese Patent Application National Publication No. 2009-520661

Patent Literature 3: Japanese Patent Application National Publication No. 2005-523996

Patent Literature 4: Japanese Patent Application Laid-Open No. 2000-93739

Patent Literature 5: Japanese Patent Application Laid-Open No. Sho 57-500021

Patent Literature 6: Japanese Patent Application Laid-Open No. 2011-206757

BRIEF SUMMARY OF THE INVENTION

Accordingly, the present invention has been proposed in view of the above-mentioned situations, and an object of the present invention is to provide a process for producing hematite, which is capable of producing low-sulfur-grade hematite usable as an ironmaking raw material in a HPAL process of a nickel oxide ore.

The present inventors have extensively conducted studies for solving the above-described problems, and resultantly found that magnesium oxide produced by passing through the following steps (1) to (5) has a low impurity grade and a high purity, and by performing a neutralization treatment using the magnesium oxide as a neutralizing agent to be added to a leached slurry obtained in a HPAL process of a nickel oxide ore, low-sulfur-grade hematite can be separated and recovered, leading to completion of the present invention.

Specifically, the first aspect of the present invention is a process for producing hematite in which a slurry is prepared by adding sulfuric acid to a nickel oxide ore, and leaching nickel and cobalt in a sulfuric acid solution at a high temperature and high pressure, a first neutralizing agent is added to the slurry to adjust pH, and the slurry is separated into a leachate containing nickel and cobalt and leached residue as hematite, and recovered, the process including using, as the first neutralizing agent, magnesium oxide produced by passing through the following steps (1) to (5):

(1) sulfurization step of adding a second neutralizing agent to the leachate to separate impurities, and adding a sulfurizing agent to the resulting neutralized solution to obtain sulfides of nickel and cobalt, followed by separating a sulfurized solution;

(2) calcium separating step of concentrating discharge waste water, which is obtained by adding a third neutralizing agent to the sulfurized solution to separate aluminum and manganese from the sulfurized solution, to precipitate and separate calcium contained in the discharge waste water as calcium sulfate;

(3) magnesium crystallizing step of further concentrating a solution, which is obtained by passing through the calcium separating step, to precipitate and separate magnesium contained in the solution as magnesium sulfate;

(4) roasting step of roasting the magnesium sulfate, which is separated in the magnesium crystallizing step, together with a reducing agent to obtain magnesium oxide and a sulfurous acid gas; and (5) washing step of washing the magnesium oxide obtained in the roasting step.

The second aspect of the present invention is the process according to the first aspect, wherein the end point of concentration of the calcium separating step (2) is a point at which the specific gravity of the concentrated solution reaches 1.25 g/cm$^3$.

The third aspect of the present invention is the process according to the first or second aspect, wherein concentration of the solution in the calcium separating step (2) and in the magnesium crystallizing step (3) is performed by natural drying.

The fourth aspect of the present invention is the process according to any one of the first to third aspects, wherein the discharge waste water is a filtrate obtained by adding the third neutralizing agent to the sulfurized solution to adjust pH to 7.0 to 8.5, and then performing solid-liquid separation.

The fifth aspect of the present invention is the process according to any one of the first to fourth aspects, wherein at least one of coke, coal, charcoal, bamboo charcoal and waste activated carbon is used in the roasting step (4).

The sixth aspect of the present invention is the process according to any one of the first to fifth aspects, wherein the sulfurous acid gas generated in the roasting step (4) is transformed into sulfuric acid and the resulting sulfuric acid is used for the leaching of the nickel oxide ore at a high temperature and high pressure repeatedly.

The seventh aspect of the present invention is the process according to any one of the first to sixth aspects, wherein the crystals of magnesium sulfate obtained in the magnesium crystallizing step (3) is dissolved by adding water thereto and the resulting solution is concentrated again in the magnesium crystallization step repeatedly.

The eighth aspect of the present invention is hematite which is produced by the process for producing hematite described above, has a sulfur grade of less than 1% by weight and a calcium grade of less than 1% by weight, and is used as an ironmaking raw material.

In the present invention, high-purity magnesium oxide having a low impurity grade is produced, and the magnesium oxide is used for neutralization of a leached slurry obtained by a process for hydrometallurgy of a nickel ore using a HPAL process, so that the grades of sulfur and calcium in leached residue generated in the HPAL process can be reduced, and thus hematite as the leached residue can be used as an ironmaking raw material. This can contribute to effective use of a resource and reduction of generation of residue.

DETAILED DESCRIPTION OF THE INVENTION

Figure 1:
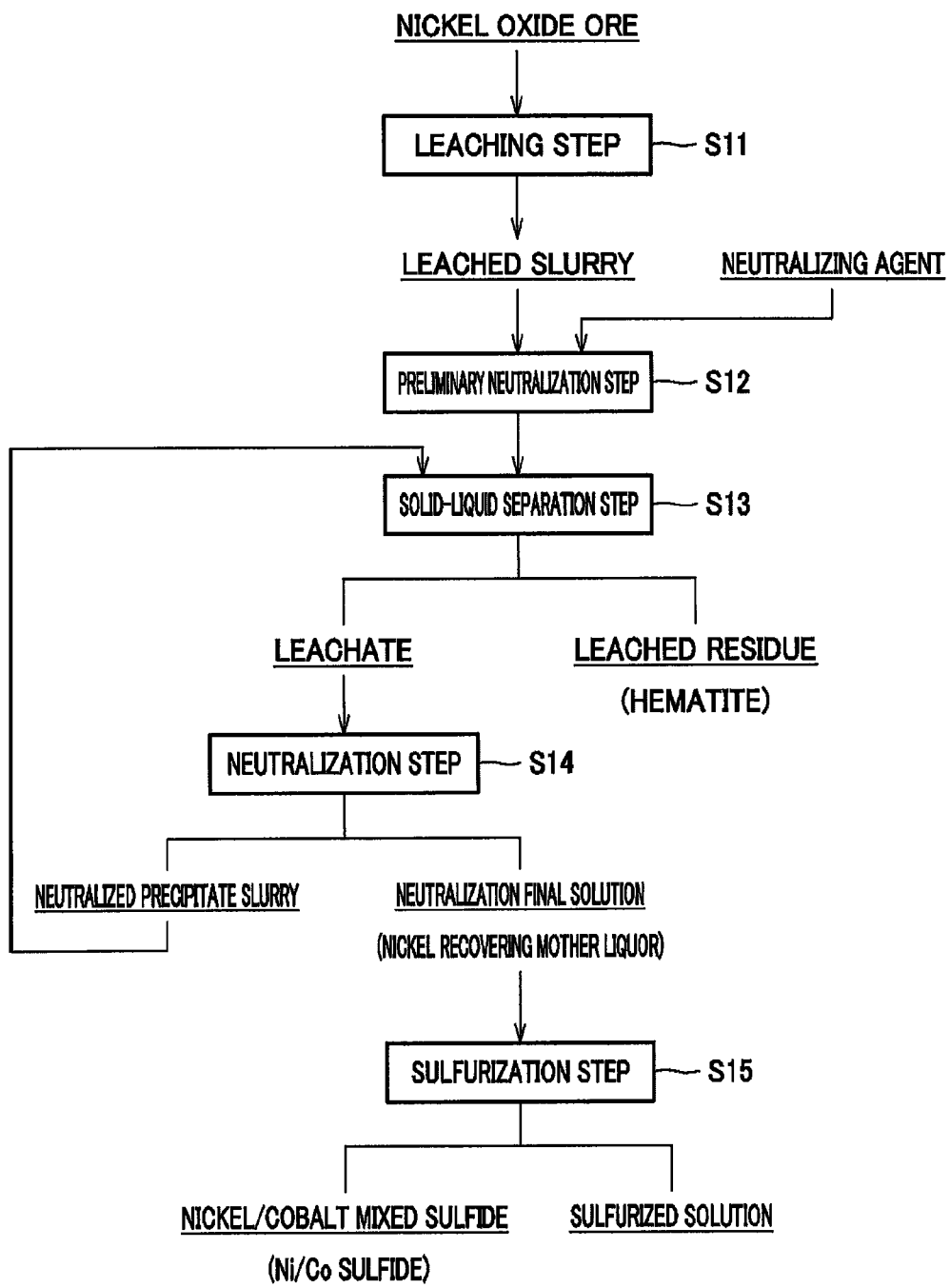
FIG. 1 is a process chart of a process for hydrometallurgy of a nickel oxide ore using a HPAL process.

Hereinafter, a specific embodiment of a process for producing hematite according to the present invention (hereinafter, referred to as this embodiment) will be described in detail in the following order with reference to the drawings. The present invention should not be limited to the following embodiment, and may be appropriately changed as long as the spirit of the present invention is not changed.

1. Outline
2. Process for producing hematite (HPAL process of nickel oxide ore)
3. Process for producing magnesium oxide
  (1) Sulfurization step (sulfurization step in HPAL process of nickel oxide ore)
  (2) Calcium separating step
  (3) Magnesium crystallizing step
  (4) Roasting step
  (5) Washing step
4. Production of magnesium oxide based on process for hydrometallurgy of nickel oxide ore
  4-1. Waste water treatment step
  4-2. Process for producing magnesium oxide
  4-3. Sulfuric acid production step
5. Examples <<1. Outline>>

The process for producing hematite according to this embodiment is intended for separating and recovering leached residue obtained by subjecting a nickel oxide ore to a leaching treatment in a process for hydrometallurgy of a nickel oxide ore using a high-temperature and high-pressure leaching process (HPAL process). Specifically, a leached slurry is prepared by adding sulfuric acid to a nickel oxide ore, and leaching nickel and cobalt in a sulfuric acid solution at a high temperature and high pressure, a neutralizing agent is added to the leached slurry to adjust pH, and the leached slurry is separated into a leachate containing nickel and cobalt and leached residue as hematite, and recovered.

In the process for producing hematite according to this embodiment, magnesium oxide produced by passing through the following steps (1) to (5) is used as the neutralizing agent (neutralizing agent for preliminary neutralization treatment, first neutralizing agent) to be added to the resulting leached slurry.

Specifically, magnesium oxide is used which is produced by passing through (1) sulfurization step of adding a neutralizing agent (neutralizing agent for neutralization treatment, second neutralizing agent) to a leachate, which is obtained by subjecting a nickel oxide ore to a leaching treatment at a high temperature and high pressure, to separate impurities, and adding a sulfurizing agent to the resulting neutralized solution to obtain sulfides of nickel and cobalt, followed by separating the sulfurized solution; (2) calcium separating step of concentrating discharge waste water, which is obtained by adding a neutralizing agent (neutralizing agent for waste water treatment, third neutralizing agent) to the sulfurized solution to separate aluminum and manganese from the sulfurized solution, to precipitate and separate calcium contained in the discharge waste water as calcium sulfate; (3) magnesium crystallizing step of further concentrating a solution, which is obtained by passing through the calcium separating step, to precipitate and separate magnesium contained in the solution as magnesium sulfate; (4) roasting step of roasting the magnesium sulfate, which is separated in the magnesium crystallizing step, together with a reducing agent to obtain magnesium oxide and a sulfurous acid gas; and (5) washing step of washing the magnesium oxide obtained in the roasting step.

In the process for producing magnesium oxide, discharge waste water containing magnesium and calcium is concentrated in two stages to separate the magnesium and the calcium as described above. Specifically, calcium is first precipitated and separated as crystals of a salt in the form of calcium sulfate dihydrate, and magnesium is precipitated and separated as crystals of a salt in the form of magnesium sulfate heptahydrate. The resulting crystals of magnesium sulfate heptahydrate are roasted together with a reducing agent such as coke or charcoal to provide magnesium oxide, and the resulting magnesium oxide is further washed to obtain high-purity magnesium oxide.

In the process for producing hematite according to this embodiment, the thus-obtained high-purity magnesium oxide having a low impurity grade is used as a neutralizing agent for (preliminary) neutralization treatment of the leached slurry obtained in the HPAL process of a nickel oxide ore. Accordingly, the grade of impurities such as sulfur and calcium in leached residue generated in the HPAL process can be reduced to produce hematite as high-purity leached residue. Specifically, hematite, which has a sulfur grade of less than 1% by weight and a calcium grade of less than 1% by weight, and can be effectively used as, for example, an ironmaking raw material, can be produced. Accordingly, the amount of residues generated in the HPAL process and deposited can be effectively reduced.

In the process for producing magnesium oxide, which includes the steps (1) to (5), high-purity magnesium oxide having a low impurity grade can be conveniently and efficiently produced from a solution containing magnesium and calcium, and by using the magnesium oxide as a neutralizing agent, hematite can be efficiently produced.

Further, magnesium oxide is produced by treating a leachate obtained by a hydrometallurgical process using a HPAL process with a nickel oxide ore as a raw material, and is used as a neutralizing agent for preliminary neutralization treatment of a leached slurry obtained by the HPAL process, and thus a neutralizing agent, sulfuric acid and the like for use in the process can be repeatedly used. Accordingly, the amounts of these agents to be newly used can be reduced, so that efficient operations can be conducted with cost reduction, effective use of a resource and so on.

<<2. Process for Producing Hematite (HPAL Process of Nickel Oxide Ore)>>

First, the process for producing hematite according to this embodiment will be described more in detail.

The process for producing hematite according to this embodiment is intended for separating and recovering hematite as leached residue by subjecting to a preliminary neutralization treatment a leached slurry obtained by subjecting a nickel oxide ore to a leaching treatment in a process for hydrometallurgy of a nickel oxide ore using a HPAL process as described above, and then subjecting the leached slurry to solid-liquid separation.

<HPAL Process of Nickel Oxide Ore>

Here, FIG. 1 illustrates a process chart of a process for hydrometallurgy of a nickel oxide ore using a HPAL process. As illustrated in FIG. 1, the process for hydrometallurgy of a nickel oxide ore includes: a leaching step S11 of leaching a nickel oxide ore slurry at a high temperature and high pressure by adding sulfuric acid thereto; a preliminary neutralization step S12 of adding a neutralizing agent to the resulting leached slurry to neutralize free acids; a solid-liquid separation step S13 of separating and recovering a leachate containing impurity elements together with nickel and cobalt, and leached residue (hematite) while washing the neutralization-treated leached slurry in multiple stages; a neutralization step S14 of adjusting the pH of the resulting leachate to separate neutralized precipitate containing impurity elements, and thus obtaining a neutralization final solution containing nickel and cobalt; and a sulfurization step S15 of subjecting the neutralization final solution to a sulfurization treatment to form a mixed sulfide containing nickel and cobalt.

(Leaching Step)

In the leaching step S11, a leached slurry including leached residue and a leachate is formed by adding sulfuric acid to a nickel oxide ore slurry, and performing a stirring treatment at a temperature of 220 to 280° C. in a high-temperature pressurized vessel (autoclave) or the like.

The nickel oxide ore is principally a so called laterite ore such as a limonite ore or a saprolite ore. The content of nickel in the laterite ore is normally 0.8 to 2.5% by weight, and the nickel is contained in the form of a hydroxide or silicate-magnesia (magnesium silicate) mineral. The content of iron is 10 to 50% by weight, and the iron exists principally in the form of a trivalent hydroxide (goethite), but divalent iron is partially contained in the silicate-magnesia mineral. In the leaching step S11, an oxide ore containing valuable metals such as nickel, cobalt, manganese and copper, for example a manganese nodule existing at the bottom of the deep part of the sea, is used in addition to such a laterite ore.

Many rocks called base rock or bed rock or host rock which contain little nickel and have a high magnesium grade also exist on the periphery of the deposits of nickel oxide ores. A solution obtained by once dissolving these rocks in an acid can be used as a magnesium source solution.

(Preliminary Neutralization Step)

In the preliminary neutralization step S12, the pH of the leached slurry obtained in the leaching step S11 is adjusted to fall within a predetermined range. In the leaching step S11 if performing a leaching treatment by the high-pressure acid leaching process, an excessive amount of sulfuric acid is added for improving the leaching ratio. Therefore, the resulting leached slurry contains free sulfuric acid (redundant sulfuric acid which has not been involved in the leaching reaction), and has low pH. Thus, in the preliminary neutralization step S12, the pH of the leached slurry is adjusted to fall within a predetermined range, so that free sulfuric acid contained in the leached slurry is neutralized. Accordingly, washing can be efficiently performed during multistage washing in the subsequent step, i.e. the solid-liquid separation step S13, leading to simplification of solid-liquid separation equipment. By neutralizing free sulfuric acid, the true density of the resulting leached residue (hematite) can be increased to stably produce leached residue having a high density.

The pH value adjusted by adding the neutralizing agent in the preliminary neutralization step S12 is preferably about 2.0 to 6.0. When the pH is lower than 2.0, costs are needed for ensuring that equipment in the solid-liquid separation step S13 has acid resistance. On the other hand, when the pH is higher than 6.0, nickel leached into the leachate (slurry) (is precipitated and) remains as residue in the process of washing, so that washing efficiency may be deteriorated. In actual operations, an appropriate set value may be selected from the above-mentioned pH range according to the operation state of the leaching treatment in the leaching step S11, and conditions such as pH of washing water used in the solid-liquid separation step S13.

Here, in the neutralization treatment in the preliminary neutralization step S12, a calcium-based neutralizing agent such as, for example, a calcium carbonate slurry or a calcium hydroxide slurry has been used heretofore. When a calcium-based neutralizing agent is used, however, calcium sulfate (gypsum) generated in the neutralization treatment also coexists as precipitates in leached residue, and therefore the grades of sulfur and calcium contained in hematite as leached residue increase. When hematite having a high sulfur grade and high calcium grade is used as an ironmaking raw material, the burden on the environment increases as a $SO_2$ gas is discharged, and the quality of iron steel may be deteriorated. Therefore, such hematite is not preferable as an ironmaking raw material.

Thus, in this embodiment, magnesium oxide obtained by a process for producing magnesium oxide as described later is used as a neutralizing agent (neutralizing agent for preliminary neutralization treatment, first neutralizing agent) to be added to the leached slurry in the neutralization treatment in the preliminary neutralization step S12.

As described in detail later, the magnesium oxide is obtained in the following manner using as a raw material a sulfurized solution (sulfuric acid solution) containing magnesium and calcium and obtained by passing through the sulfurization step S15 in the HPAL process of a nickel oxide ore. That is, the sulfurized solution is concentrated in two stages to separate the magnesium oxide. Accordingly, the magnesium oxide has a low grade of impurities such as calcium and a high purity. Therefore, by using the magnesium oxide as a neutralizing agent in the neutralization treatment in the preliminary neutralization step S12, hematite having a low impurity grade can be produced, and effectively used as an ironmaking raw material.

(Solid-Liquid Separation Step)

In the solid-liquid separation step S13, the leached slurry after neutralization of free sulfuric acid in the preliminary neutralization step S12 is separated into a leachate containing nickel and cobalt (crude nickel sulfate aqueous solution) and leached residue as hematite, and recovered while the leached slurry is washed in multiple stages.

In the solid-liquid separation step S13, for example, the leached slurry is mixed with a washing solution, and the mixture is then subjected to a solid-liquid separation treatment by solid-liquid separation equipment such as a thickener using a coagulant supplied from coagulant supply equipment etc. Specifically, the leached slurry is first diluted with the washing solution, and leached residue in the slurry are then concentrated as a sediment in the thickener. Accordingly, the content of nickel sticking to the leached residue can be decreased in accordance with the degree of dilution.

In the solid-liquid separation step S13, it is preferred that solid-liquid separation tanks such as thickeners are connected in multiple stages, and the leached slurry is subjected to solid-liquid separation while being washed in multiple stages. Specifically, for example, a countercurrent washing process (CCD process) in which a washing solution is brought into contact countercurrently with the leached slurry can be used as a multistage washing process.

Hematite can be obtained by performing a solid-liquid separation treatment in the solid-liquid separation step S13 to separate and recover leached residue as hematite from a leached slurry in the manner described above. The hematite thus obtained has a low grade of impurities such as sulfur and calcium, and can be effectively used as an ironmaking raw material because it is obtained using high-purity magnesium oxide having a low impurity grade as a neutralizing agent in the neutralization treatment in the preliminary neutralization step S12.

(Neutralization Step)

In the neutralization step S14, the pH of the leachate (crude nickel sulfate aqueous solution) separated in the solid-liquid separation step S13 is adjusted to separate neutralized precipitate containing impurity elements, and thus a neutralization final solution containing nickel and cobalt is obtained.

Specifically, in the neutralization step S14, a neutralizing agent (neutralizing agent for neutralization treatment, second neutralizing agent) such as magnesium oxide or calcium carbonate is added so that the pH is 4.0 or less, preferably 3.0 to 3.5, more preferably 3.1 to 3.2 while oxidation of the separated leachate is suppressed, and thus a neutralized precipitate slurry containing trivalent iron as an impurity and a nickel recovering mother liquor as the neutralization final solution are formed.

(Sulfurization Step)

In the sulfurization step S15, a sulfurizing agent such as a hydrogen sulfide gas is blown into the nickel recovering mother liquor to form a sulfide containing nickel and cobalt (nickel/cobalt mixed sulfide) having a small amount of impurity components and a barren liquor (sulfurized solution) having a stable nickel concentration at a low grade. When the nickel recovering mother liquor contains zinc, zinc can be selectively separated as a sulfide before nickel and cobalt are separated as a sulfide.

In the sulfurization step S15, a slurry of the nickel/cobalt mixed sulfide is subjected to a sedimentation and separation treatment using a sedimentation and separation apparatus such as a thickener, so that the nickel/cobalt mixed sulfide is separated and recovered from the bottom of the thickener, and the aqueous solution component is made to overflow and recovered as a sulfurized solution. The sulfurized solution is a sulfuric acid solution containing magnesium, calcium and the like which are not sulfurized, and remain.

In this embodiment, a process for producing magnesium oxide as described later is carried out using as a raw material the sulfurized solution obtained in the sulfurization step S15, and high-purity magnesium oxide is obtained from the sulfurized solution. In this embodiment, a sulfurized solution obtained in the HPAL process of a nickel oxide ore is used for production of magnesium oxide as described above, and the produced magnesium oxide is used as a neutralizing agent for preliminary neutralization, which is added to the leached slurry, so that the neutralizing agent can be repeatedly used. Accordingly, the use amount of a new neutralizing agent can be remarkably reduced, so that efficient smelting operations can be conducted.

<<3. Process for Producing Magnesium Oxide>>

Figure 2:
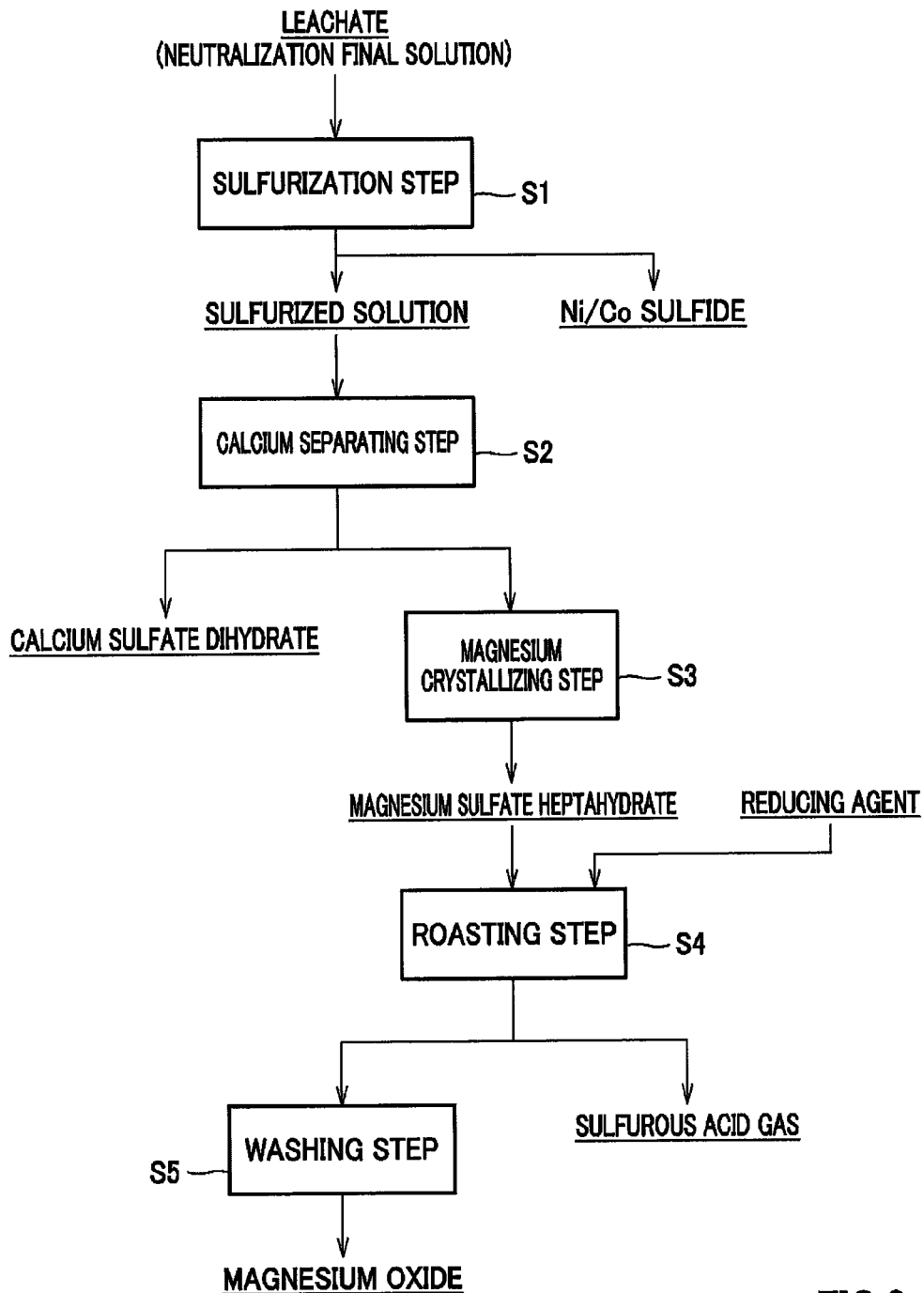
FIG. 2 is a process chart showing a flow of a process for producing magnesium oxide.

The process for producing magnesium oxide to be used as a neutralizing agent (first neutralizing agent) for preliminary neutralization treatment in the process for producing hematite will now be described in detail for respective steps. FIG. 2 is a process chart of the process for producing magnesium oxide.

(1) Sulfurization Step (Sulfurization Step in HPAL Process of Nickel Oxide Ore)

The sulfurization step S1 is a step of generating sulfides of nickel and cobalt and a sulfurized solution by adding a sulfurizing agent to a neutralization final solution obtained by adding a neutralizing agent (neutralizing agent for neutralization treatment, second neutralizing agent) to a leachate generated by leaching a nickel oxide ore at a high temperature and high pressure in a process for hydrometallurgy of a nickel oxide ore using a HPAL process.

Since the sulfurization step S1 is similar to that described in the above HPAL process (sulfurization step S15), descriptions thereof are omitted here. That is, the process for producing magnesium oxide uses as a raw material a sulfurized solution obtained in the process for hydrometallurgy of a nickel oxide ore using a HPAL process. The sulfurized solution obtained by passing through the sulfurization treatment in the sulfurization step S1 is a sulfuric acid solution containing aluminum, manganese, magnesium, calcium and the like, and has a pH of about 1.0 to 3.0.

(2) Calcium Separating Step

In the calcium separating step S2, discharge waste water obtained by adding a neutralizing agent (neutralizing agent for waste water treatment, third neutralizing agent) to the resulting sulfurized solution to separate aluminum and manganese from the sulfurized solution is concentrated to precipitate and separate calcium contained in the discharge waste water as calcium sulfate. The calcium separating step S2 is a step of performing concentration and separation in the first stage.

The sulfuric acid solution to be concentrated is a sulfuric acid solution containing magnesium and calcium, which is discharge waste water obtained by separating and removing aluminum and manganese from a sulfurized solution containing impurity elements such as aluminum and manganese and obtained by passing through the sulfurization step S1 in the process for hydrometallurgy of a nickel oxide ore as described above. In the calcium separating step S2, first a neutralizing agent for waste water treatment is added to the sulfurized solution, whereby the pH of the sulfurized solution is adjusted to 7.0 to 8.5 to perform a neutralization treatment (waste water treatment), and the resulting precipitates of aluminum, manganese and the like are solid-liquid-separated to obtain discharge waste water as a filtrate. When a sulfuric acid solution obtained by subjecting the sulfurized solution to a waste water treatment is used as a raw material for production of magnesium oxide as described above, the purity of crystals can be further improved, so that magnesium oxide with higher quality can be produced.

The concentration and separation treatment in the calcium separating step S2 takes advantage of the following characteristic: the solubility of calcium sulfate dihydrate is lower than that of magnesium sulfate heptahydrate, so that calcium sulfate dihydrate is precipitated prior to magnesium sulfate heptahydrate in the concentration process. Accordingly, calcium contained in the sulfuric acid solution is selectively separated.

The size of calcium sulfate crystals to be precipitated is not particularly limited, and not uniquely determined, and may be appropriately selected according to the concentration yield and the degree of separation of coexisting impurities by conducting a test beforehand.

The process for concentration of the sulfuric acid solution is not particularly limited as long as it is capable of precipitating crystals of calcium by evaporating water in the sulfuric acid solution, and various processes may be used. Examples thereof include processes that have been generally employed, i.e. processes in which the sulfuric acid solution is heated from the outside using oil, electric power or the like. Among the various processes, a process for concentrating the sulfuric acid solution by natural drying (drying in the sun) using natural energy such as solar heat, geothermal heat or a wind is especially preferably used.

The process for concentrating the sulfuric acid solution by heating from the outside and the process for concentrating the sulfuric acid solution by natural drying as described above are not necessarily employed singly, but may be appropriately combined, e.g. the sulfuric acid solution is preliminarily concentrated by heating from the outside within the bounds of not precipitating crystals, and then naturally dried, or concentrated in order opposite to the above.

Specifically, as the process for concentrating the sulfuric acid solution by natural drying, various processes can be used, such as a process in which discharge waste water (sulfuric acid solution) to be concentrated is placed in a container, and left standing outdoors to be dried in the sun, and a process in which the sulfuric acid solution is added dropwise onto a branched rack with the sulfuric acid solution drawn up through a bamboo or vinyl pipe like one that was used in the past in a flow-down-type saltpan, and grown crystals are recovered.

Preferably, the concentration treatment suitable for separation of calcium in the calcium separating step S2 is performed at a grade which ensures that calcium sulfate dihydrate is precipitated, and precipitation of magnesium sulfate heptahydrate is minimized. The grade can be specified by various processes such as a process in which the components of the solution are analyzed, a process in which a difference in appearance is observed by naked eyes, or a process in which the specific gravity is measured.

Particularly, the process in which the degree of the concentration treatment, i.e. the end point of the concentration treatment is determined by measurement of the specific gravity allows calcium to be effectively separated and removed using a simple process. Specifically, the present inventors have found that when the sulfuric acid solution is gradually concentrated by natural drying, crystallization of calcium sulfate occurs when the specific gravity of the solution is below a specific range, and crystallization of magnesium sulfate is started in progression when the specific gravity of the solution exceeds the specific range as concentration proceeds, the specific range being from 1.1 to 1.3 g/cm$^3$.

For example, in the case of a sulfuric acid solution (sulfurized solution) which is discharged by passing through the HPAL process and has a magnesium concentration of 5 g/L and a calcium concentration of about 0.5 g/L, 80 to 90% or more of calcium contained in the solution can be effectively separated and removed during concentration of the solution until the above-mentioned specific gravity is achieved.

Therefore, when in the calcium separating step S2, the specific gravity of the sulfuric acid solution is measured, and according to an appropriate grade, the time point at which the specific gravity comes to fall within the range of about 1.1 to 1.3 g/cm$^3$ is determined as the end point of the concentration treatment, calcium can be effectively separated at a high ratio using a simple process, i.e. specific gravity measurement. More preferably, the time point at which the specific gravity reaches about 1.25 g/cm$^3$ is determined as the end point of the concentration treatment, so that calcium can be further effectively separated at a high ratio.

Solid-liquid separation between crystals of crystallized calcium sulfate and the solution can be performed using a filtering apparatus, a centrifugal separation apparatus or the like. In the case where crystal grains to be crystallized are coarse, the use of such an apparatus causes solid-liquid separation to quickly proceed, allows compact equipment to be used, and is advantageous in terms of quality because the amount of moisture sticking to crystals is kept small.

(3) Magnesium Crystallizing Step

In the magnesium crystallizing step S3, the solution obtained by passing through the calcium separating step S2 in (2) is further concentrated, magnesium in the solution is precipitated and taken out as crystals of magnesium sulfate heptahydrate. The magnesium crystallizing step S3 is a step of performing concentration and separation in the second stage.

As the concentration process in the magnesium crystallizing step S3, various processes can be used as in the case of the concentration process in the calcium separating step S2 in (2) described above, and a process for concentrating the solution by natural drying (drying in the sun) using natural energy such as solar heat, geothermal heat or a wind is especially preferably used. Alternatively, these concentration processes can be combined.

Here, concentration by natural drying as the concentration process in the magnesium crystallizing step S3 as well as in the calcium separating step S2 appears to be inefficient because a larger amount of time is needed as compared to the concentration process by heating from the outside using oil, electric power or the like. However, for example, a sulfuric acid solution (sulfurized solution) generated in the process for hydrometallurgy of a nickel oxide ore contains about 10 to 20 g/L of magnesium, and can be much more efficiently concentrated into magnesium as compared to seawater containing only about 1.3 g/L of magnesium.

In drying with the use of natural energy, water is gradually evaporated, and therefore the state of the solution during evaporation can be minutely managed. Further, crystals of a salt that is precipitated is coarsely grown, and therefore impurities that are not to be recovered, such as aluminum, can be inhibited from entering gaps between crystal grains of magnesium sulfate, so that high-purity crystals having a small amount of impurities can be obtained.

Figure 3A:
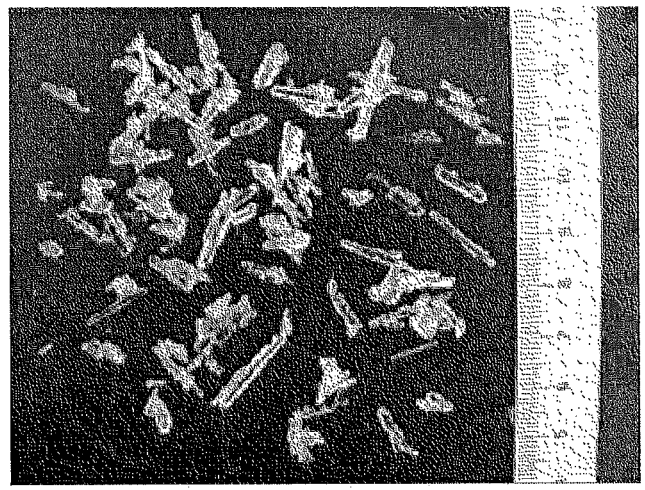
FIG. 3(A) is a photograph showing a crystal condition of magnesium sulfate formed through a concentration treatment by natural drying (drying in the sun)
Figure 3B:
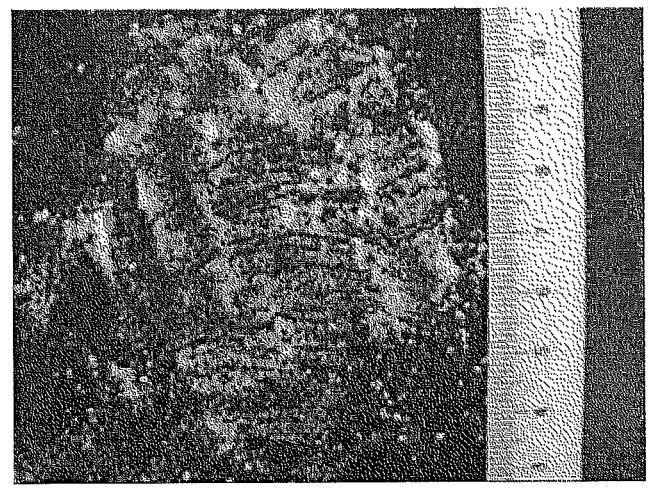
FIG. 3(B) is a photograph showing a crystal condition of magnesium sulfate formed through a concentration treatment by external heat.

FIG. 3(A) is a photograph showing a crystal condition where in the magnesium crystallizing step S3, the solution is left standing outdoors to be naturally dried (dried in the sun), whereby a concentration treatment is performed to precipitate crystals of magnesium sulfate. On the other hand, FIG. 3(B) is a photograph showing a crystal condition where water is evaporated in a water bath heated to 80° C. by external electric power, whereby a concentration treatment is performed to precipitate crystals of magnesium sulfate. It is apparent from the photographs in FIGS. 3(A) and 3(B) that by precipitating crystals of magnesium sulfate through a concentration treatment by natural drying, much larger crystals can be formed as compared to the case where water is evaporated by heating from the outside to crystallize the solution.

Thus, in the magnesium crystallizing step S3, coarse crystal grains of magnesium sulfate can be efficiently precipitated and recovered by precipitating crystals by concentrating the solution at a low drying rate using, for example, natural drying. By growing crystals to a large size, calcium components stuck on the crystal surfaces and calcium components coprecipitated and caught in magnesium crystals can be reduced. Since such coarse crystals can be formed, a situation can be suppressed in which during reduction and roasting in the subsequent step, i.e. the roasting step S4, crystals are scattered and formed into dusts to cause a recovery loss.

In concentration treatment, by immersing crystals of magnesium sulfate in the solution as seeds, the crystals serve as a nucleus to cause precipitation of crystals of magnesium sulfate, so that more coarse crystals can be efficiently obtained.

The end point of the concentration treatment in the magnesium crystallizing step S3 can be arbitrarily determined. Solid-liquid separation between crystals of crystallized magnesium sulfate and the solution can be performed using a filtering apparatus, a centrifugal separation apparatus or the like as in the case of the calcium separating step S2.

In natural drying (drying in the sun), the solution is gradually dried over, for example, several days to several weeks, but due to factors such as humidity and temperature, it is difficult to uniquely determine the drying rate, i.e. necessary drying time to liquid amount. Accordingly, it is preferred to appropriately determine the drying rate according to these various factors.

Evaporation may be accelerated by heating as long as the drying rate is comparable to that in natural drying, but efficiency may be extremely deteriorated as compared to natural drying. When the concentration of magnesium in the solution is low, a process may be used in which the solution is concentrated to some degree using a water bath etc., and then naturally dried for reducing the drying time. Further, a process may be employed in which the solution is sprayed to a solid to accelerate precipitation of crystals on the surface of the solid, as was done, for example, in a dripping-type saltpan in the past.

Further, a procedure may be carried out one or more times in which crystals of magnesium sulfate obtained by concentration are dissolved again by adding water thereto, and crystals of magnesium sulfate are precipitated again from the solution. Accordingly, crystals of magnesium sulfate having a further small amount of impurities can be precipitated.

(4) Roasting Step

In the roasting step S4, the magnesium sulfate obtained in the magnesium crystallizing step S3 in (3) is roasted together with a reducing agent to obtain magnesium oxide and a sulfurous acid gas.

In the roasting step S4, magnesium sulfate is reductively decomposed to cause a reaction for generating magnesium oxide, a sulfurous acid gas and water as shown in, for example, the following reaction formula (i).

$$MgSO_4 \cdot 7H_2O + \tfrac{1}{2}C \rightarrow MgO + SO_2 + \tfrac{1}{2}CO_2 + 7H_2O \qquad (i)$$

As a reducing agent to be used in the roasting step S4, for example, coke can be used as shown in the reaction formula (i), and other carbon-based reducing agents such as coal, charcoal, bamboo charcoal and waste activated carbon can be used. Alternatively, a propane gas, a LPG gas or the like may be used as a reducing agent. Among them, charcoal, bamboo charcoal and the like are renewable energy, and particularly environmentally advantageous.

It is also possible to use sulfur as a reducing agent, but if sulfur remains, it is necessary to detoxify an exhaust gas at the time of using magnesium oxide, so that precipitates of manganese obtained by passing through a waste water treatment and the waste water treatment itself may be affected, and therefore the use of sulfur as a reducing agent is not preferable. Particularly in production of magnesium oxide to be used as a neutralizing agent for producing hematite as in this embodiment, the use of sulfur as a reducing agent is not preferable because the sulfur grade of hematite may increase, and it may be unable to effectively use the hematite as an ironmaking raw material.

The equivalent of the reducing agent may be selected by conducting a test beforehand, but for example, in the case of coke, 1 equivalent of the reducing agent is a little insufficient, and it is desirable to add about 2 equivalents of the reducing agent.

Other conditions in the reduction and roasting treatment are not particularly limited, and may be appropriately selected according to the amount of magnesium, the type of reducing agent, the apparatus to be used, and so on. For example, when magnesium sulfate is roasted using coke as a reducing agent and using a rotary kiln, it is desirable that the additive amount of the reducing agent be not less than 0.5 mol/mol, which corresponds to 2 equivalents to magnesium, the reaction temperature be about 950 to 1100° C., and the retention time be about 1 to 5 hours.

(5) Washing Step

In the washing step S5, the magnesium oxide obtained in the roasting step S4 in (4) is washed. The magnesium oxide generated in the roasting step S4 can be used directly as a neutralizing agent for preliminary neutralization treatment as described later, but the purity of the magnesium oxide can be further improved by performing a washing treatment in this way.

Water can be used for the washing treatment in the washing step S5. The solubility of magnesium oxide in water is 0.0086 g/100 ml at 20° C. Accordingly, by washing with water in the washing step S5, a substance having a solubility higher than the solubility of magnesium oxide in water can be separated, so that the purity of the magnesium oxide can be improved.

More specifically, in the case of calcium sulfate, the solubility of calcium sulfate anhydride in water at 20° C. is 0.24 g/100 ml, and is thus much higher than the solubility of magnesium oxide at 20° C. Accordingly, calcium that cannot be separated by the two-stage concentration treatment in the calcium separating step S2 in (2) and the magnesium crystallizing step S3 in (3) described above can be separated in the washing treatment in the washing step S5, so that magnesium oxide having a further high purity can be obtained.

As described above, in the process for producing magnesium oxide, a concentration treatment is performed in two stages in which calcium is first precipitated and separated as crystals of calcium sulfate from a sulfuric acid solution containing magnesium and calcium, and magnesium is precipitated and separated as crystals of magnesium sulfate from the solution after calcium is separated and removed. The resulting crystals of magnesium sulfate heptahydrate are roasted together with a reducing agent to provide magnesium oxide, and the magnesium oxide is further washed to obtain high-purity magnesium oxide.

According to the above-mentioned process, high-purity magnesium oxide having a low grade of impurities such as calcium can be effectively produced by a simple procedure from a solution containing magnesium and calcium, such as, for example, discharge waste water.

In the process for producing hematite according to this embodiment, the magnesium oxide is used as a neutralizing agent for preliminary neutralization treatment of the leached slurry obtained in the HPAL process of a nickel oxide ore. In this manner, the grade of impurities such as sulfur and calcium in leached residue generated in the HPAL process can be reduced to produce hematite as high-purity leached residue. Specifically, hematite, which has a sulfur grade of less than 1% by weight and a calcium grade of less than 1% by weight, and can be effectively used as, for example, an ironmaking raw material, can be produced.

According to the above-mentioned production process, the amount of residues generated in the HPAL process and deposited can be effectively reduced.

Low-impurity-grade and high-purity magnesium oxide produced in the manner described above can be used not only as a neutralizing agent to be used for preliminary neutralization treatment of a leached slurry, but also in a fireproof brick that forms, for example, an electric furnace, a material of an alloy, and so on.

<<4. Production of Magnesium Oxide Based on Process for Hydrometallurgy of Nickel Oxide Ore>>

As described above, the process for producing magnesium oxide uses as a raw material a sulfurized solution obtained in the process for hydrometallurgy of a nickel oxide ore using a HPAL process. More specifically, a solution (sulfurized solution) after a nickel oxide ore is leached by a high-temperature and high-pressure leaching process (HPAL process) to obtain a leachate containing nickel, a neutralizing agent containing calcium and/or magnesium is added to the leachate to separate impurities, and a sulfurizing agent is then added to precipitate and separate a mixed sulfide of nickel and cobalt is used as a raw material.

Figure 4:
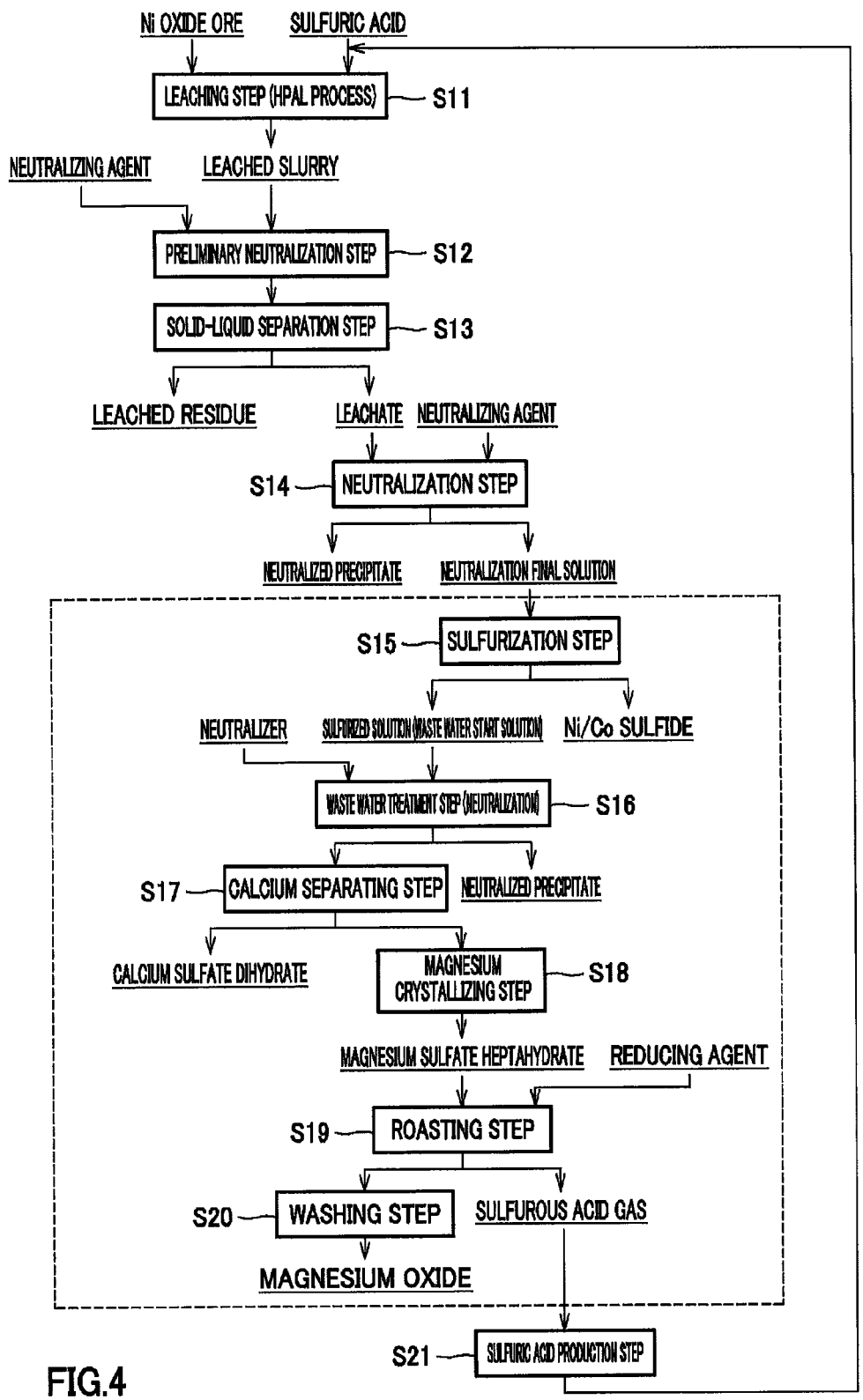
FIG. 4 is a process chart showing a flow of a process for producing magnesium oxide based on a process for hydrometallurgy of a nickel oxide ore.

FIG. 4 is a process chart more clearly showing a flow in which magnesium oxide is produced by the above-mentioned production process using a sulfurized solution obtained by separating a nickel/cobalt mixed sulfide by a process for hydrometallurgy of a nickel oxide ore using a HPAL process. The part surrounded by a dotted line in the process chart of FIG. 4 corresponds to the process chart shown in FIG. 2.

As described above, the sulfurized solution obtained in the sulfurization step S15 in the HPAL process of a nickel oxide ore is a sulfuric acid solution containing impurities such as metals and heavy metals such as iron and aluminum in addition to magnesium and calcium. In use of the sulfurized solution as a raw material in the process for producing magnesium oxide, it is preferred that impurities contained in the sulfuric acid solution are removed as much as possible. Accordingly, the waste water treatment step S16 for removing these impurities is carried out before magnesium oxide is produced using the sulfurized solution obtained in the sulfurization step S15.

The waste water treatment (neutralization treatment) in the waste water treatment step S16 constitutes a part of the treatment in the calcium separating step S2 as described with reference to FIG. 2, and the waste water treatment step S16 and calcium separating step S17 in FIG. 4 correspond to the calcium separating step S2 in FIG. 2.

<4-1. Waste Water Treatment Step>

Specifically, in the waste water treatment step S16, a neutralizing agent (third neutralizing agent) for waste water treatment is added to the sulfurized solution (waste water treatment start solution) obtained by passing through the sulfurization step S15, so that pH is adjusted to form neutralized precipitate containing impurities such as iron, aluminum and heavy metals. Accordingly, impurities can be removed from the sulfuric acid solution, so that the impurity grade in crystals formed in production of magnesium oxide which is subsequently performed can be reduced to produce magnesium oxide having a high purity.

Specifically, first, as described in Patent Literature 6, a neutralizing agent is added to a sulfurized solution to separate aluminum at relatively low pH, and manganese is then separated as precipitates by performing an oxidation and neutralization treatment in which another neutralizing agent is added to oxidize the sulfurized solution. Subsequently, pH is adjusted to 7.0 to 8.5 by further adding a neutralizing agent to waste water after separation of manganese, so that the waste water is solid-liquid-separated into neutralized precipitate and a waste water treatment final solution (discharge waste solution).

Magnesium oxide is produced in the manner described above using the waste water treatment final solution (discharge waste solution) which contains magnesium and calcium and which is obtained by passing through the sulfurization step S15 in the process for hydrometallurgy of a nickel oxide ore and freed of impurities in the waste water treatment step S16 in the manner described above.

<4-2. Process for Producing Magnesium Oxide>

Specifically, the process for producing magnesium oxide includes: a calcium separating step S17 of concentrating a sulfuric acid solution (discharge waste water), which contains magnesium and calcium, to precipitate and separate calcium as calcium sulfate; a magnesium crystallizing step S18 of further concentrating the resulting solution to precipitate and separate magnesium as magnesium sulfate; a roasting step S19 of roasting the separated crystals of magnesium sulfate together with a reducing agent to obtain magnesium oxide and a sulfurous acid gas; and a washing step S20 of washing the magnesium oxide obtained by the roasting. The steps are similar to those described above, and therefore detailed descriptions thereof are omitted.

As described above, by the process for producing magnesium oxide, magnesium oxide can be produced efficiently and with a high purity from a sulfurized solution obtained in the sulfurization step S15 in the process for hydrometallurgy of a nickel oxide ore.

When magnesium oxide is produced from a sulfurized solution obtained in a process for hydrometallurgy of a nickel oxide ore using a HPAL process as described above, and the magnesium oxide is used as a neutralizing agent for preliminary neutralization treatment of a leached slurry, leached residue (hematite) having a low grade of sulfur and calcium can be produced, and the amount of residues which have been deposited in reclamation etc. heretofore can be reduced.

Magnesium dissolved by the preliminary neutralization treatment passes through the sulfurization step S15 to be circulated to the waste water treatment step S16 in the HPAL process, and therefore by crystallizing the magnesium again, it can be repeatedly used as a neutralizing agent. Accordingly, the amounts of the neutralizing agent to be newly used can be reduced, so that efficient operations can be conducted from the viewpoint of operation costs etc.

<4-3. Sulfuric Acid Production Step>

In the above-mentioned process for producing magnesium oxide, magnesium oxide is obtained and a sulfurous acid gas ($SO_2$) is generated by reductively roasting magnesium sulfate as shown in the above reaction formula (i) in the roasting step S19. The generated sulfurous acid gas cannot be released as it is. On the other hand, the sulfurous acid gas can be effectively used because it serves as a raw material of sulfuric acid. Thus, a sulfuric acid production step S21 of collecting the generated sulfurous acid gas to be transformed into sulfuric acid can be carried out.

In the sulfuric acid production step S21, the sulfurous acid gas obtained by passing through the roasting step S19 is collected to produce sulfuric acid. The process for producing sulfuric acid is not particularly limited, and a known process can be used.

A sulfurous acid gas is collected to produce sulfuric acid in the sulfuric acid production step S21 as described above, and the produced sulfuric acid can be reused as sulfuric acid to be used in the leaching step S11 in the process for hydrometallurgy of a nickel oxide ore. Accordingly, the amount of sulfuric acid that is newly provided can be reduced, so that operation costs can be reduced to conduct more efficient operations. The amount of wastes can also be reduced, and thus burden on the environment can be considerably reduced.

EXAMPLES

<<5. Examples>>

Hereinafter, examples of the present invention will be described, but the present invention is not limited to examples below.

Example 1

<Production of High-Purity Magnesium Oxide>

(Separation of Calcium Sulfate and Crystallization of Magnesium Sulfate)

Calcium sulfate dihydrate and magnesium sulfate heptahydrate were dissolved in pure water to prepare 300 ml of an aqueous solution adjusted so as to have a magnesium concentration of 25 g/L and a calcium concentration of 0.5 g/L. The solution was divided into three equal parts as samples 1 to 3, each of which was added in a beaker with a volume of 200 ml.

Next, a water bath kept at 70° C. was provided in a draft, and samples 1 to 3 were heated to evaporate water and concentrate the solution. Concentration of the solution was carried out by initially evaporating a moderate amount of water that did not cause precipitation of crystals with the solution held in the water bath at 70° C., and then naturally drying (evaporating) the solution while accurately measuring the evaporation amount with the solution held in the water bath and kept at 30° C. After the solution was held for 2 to 5 hours, crystals were precipitated. Then, the amount of crystals and the liquid amount after filtration of crystals were measured for each sample, and the concentrations of the respective metal ions were analyzed by ICP. Table 1 below shows the results of analysis for the respective samples.

TABLE 1

|  | Sample 1 | Sample 2 | Sample 3 |
|---|---|---|---|
| Liquid evaporation amount (ml) | 40 | 51 | 60 |
| Precipitation amount of crystals after drying (mg) | 40 | 50 | 200 |
| Amount of filtrate (ml) | 57 | 46 | 36 |
| Mg concentration in filtrate (g/l) | 44 | 55 | 64 |
| Ca concentration in filtrate (g/l) | 0.85 | 0.90 | 0.48 |
| Ca removal ratio (%) | 3 | 18 | 65 |
| Specific gravity | 1.19 | 1.25 | 1.28 |
| Distribution of Mg in filtrate (%) | 99.5 | 99.3 | 92.8 |

As shown in Table 1, it is apparent that the amount of crystals precipitated increases as the amount of liquid evaporated increases. From the value measured by analysis using ICP, the amount of calcium remaining on the solution side (filtrate side) was calculated to determine the remaining ratio and removal ratio of calcium. The result of calculating the remaining ratio and removal ratio of calcium showed that it was able to precipitate and separate 3% to 65% of calcium as crystals of calcium sulfate dihydrate while leaving 99.5% to 92.8% of magnesium contained in the start liquid on the filtrate side.

Figure 5:
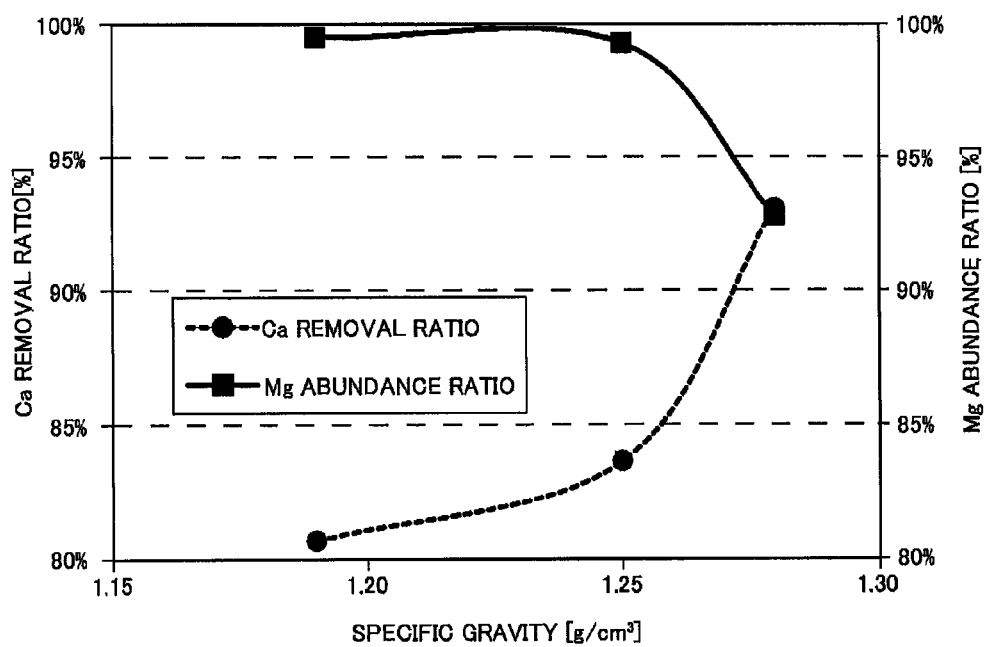
FIG. 5 is a graph showing a calcium removal ratio and an abundance ratio of magnesium in the solution to a specific gravity of the solution.

FIG. 5 is a graph showing a calcium removal ratio and an abundance ratio of magnesium in the solution to a specific gravity of the solution. From the graph in FIG. 5, it is apparent that by terminating the concentration treatment for separation of calcium when the specific gravity of the solution comes to fall within the range of particularly 1.15 to 1.30 g/cm$^3$, particularly reaches about 1.25 g/cm$^3$, crystals of calcium can be effectively precipitated and separated while the amount of magnesium remaining in the solution is increased.

Next, concentration was further continued using a solution having the same concentration degree as that of sample 3. Specifically, concentration by natural evaporation was continued to crystallize magnesium in the solution. As a result, subsequently to precipitation of calcium sulfate dihydrate, crystals of magnesium sulfate heptahydrate started precipitating, and was separated from the solution. The result of calculation based on the value measured by analysis showed that the amount of the precipitated crystals was 0.05 mol for magnesium sulfate heptahydrate, and 0.005 mol for calcium sulfate dihydrate (Mg:Ca=10:1).

Further, for examining influences of the grain size on the crystal grade in crystallization of magnesium from a solution concentrated like samples 1 to 3, a solution having a magnesium concentration of 25 g/L and a calcium concentration of 0.5 g/L (concentrated simulation liquid) was prepared using reagents of magnesium sulfate heptahydrate and calcium sulfate dihydrate, and 200 ml-aliquots were taken from the solution. One aliquot was exposed to the open air to be naturally dried (dried in the sun), so that crystals having a large grain size were obtained (see FIG. 3(A)), The other aliquot was heated to 80° C. in a water bath, and then cooled to 30° C., so that crystals having a small grain size were obtained (see FIG. 3(B)).

Natural drying (drying in the sun) was performed by left standing the solution for 1 month at a site where only a roof was provided so as not to expose the solution to rain in December with an average air temperature of 8.3° C., a maximum air temperature of 11.8° C., a minimum air temperature of 5.4° C. and a sunshine duration of 112 hours in total. During this period, about 140 g of water was evaporated.

The respective crystals obtained in this manner were analyzed by ICP to examine the Ca grade in crystals. The results of analysis are shown in Table 2 below.

TABLE 2

| Drying process | Natural drying (drying in the sun) | Natural evaporation (water bath) |
|---|---|---|
| Picture of crystals | FIG. 3 (A) | FIG. 3 (B) |
| Grain size | Large | Small |
| Weight of crystals (g) | 33.1 | 25.3 |
| Amount of filtrate after precipitation of crystals (ml) | 27.5 | 33.0 |
| Crystal Ca grade (wt/%) | 0.20 | 0.32 |
| Crystal Mg grade (wt/%) | 9.7 | 10.0 |

As shown in Table 2, it is apparent that the Ca grade in crystals can be reduced by natural drying (drying in the sun).

Roasting

Next, crystals of magnesium sulfate heptahydrate separated from the solution by the natural drying as described above were divided into two parts, and added in two crucibles, respectively. Carbon (pure graphite: C=100%) as a reducing agent was added to these crucibles in an amount of 0.025 mol and an amount of 0.05 mol, respectively, and the crucibles were heated to 1000° C. while air was blown into the crucibles at a rate of 2.5 liters per minute. Thereafter, the crucibles were held for 1 hour to be slowly cooled. The additive amounts of carbon were amounts corresponding, respectively, to 1 equivalent and 2 equivalents of the requirement for reaction.

Figure 6:
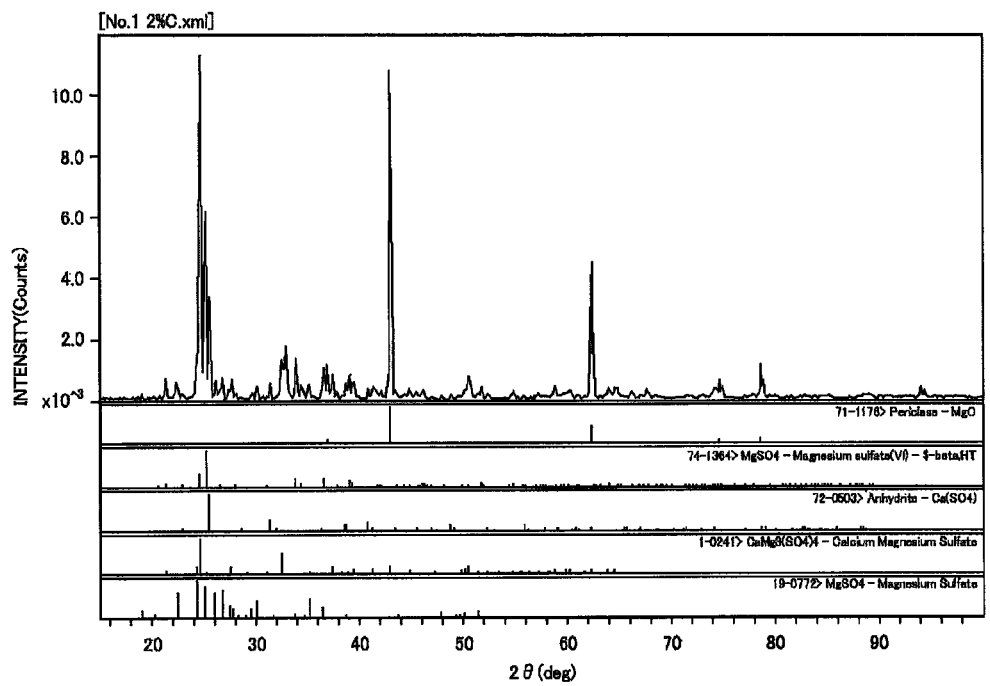
FIG. 6 is a graph showing results of XRD analysis of crystals where the additive amount of carbon is 0.025 mol.
Figure 7:
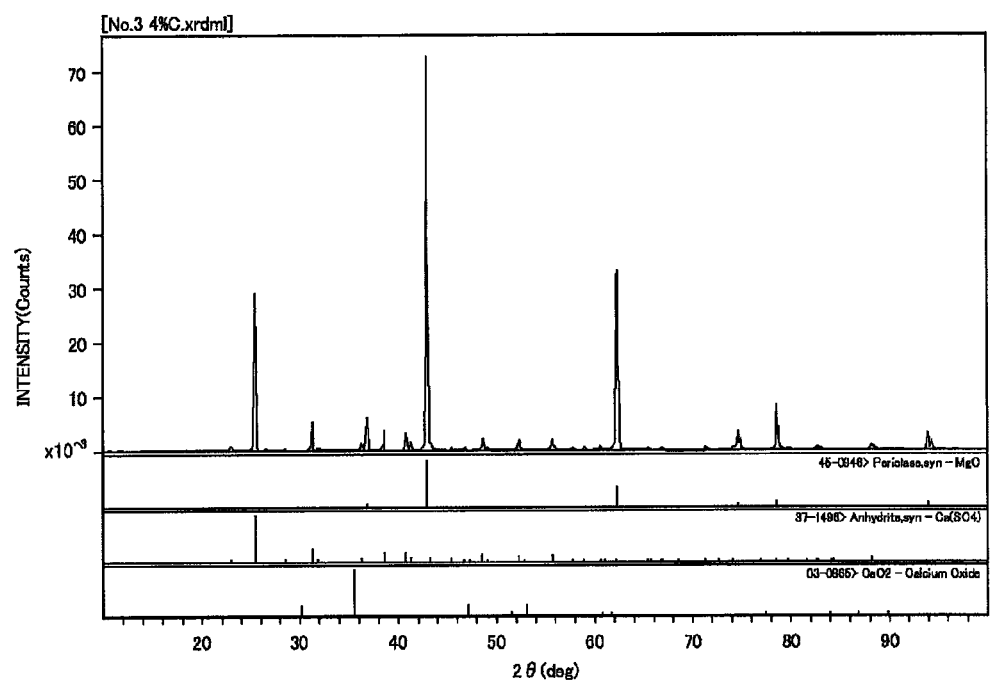
FIG. 7 is a graph showing results of XRD analysis of crystals where the additive amount of carbon is 0.05 mol.

After cooling, the crystals were taken out from the respective crucibles, and morphologically analyzed using an X-ray diffractometer (XRD). FIG. 6 shows results of XRD analysis of crystals where the additive amount of carbon is 0.025 mol, and FIG. 7 shows results of XRD analysis of crystals where the additive amount of carbon is 0.05 mol.

From the results shown in FIG. 6, it is apparent that in the case where the additive amount of carbon is 0.025 mol (1 equivalent), a peak of magnesium sulfate is detected, and thus all the crystals of magnesium sulfate obtained by concentration and separation are not converted into magnesium oxide. That is, it was confirmed that roasting was insufficient. On the other hand, from the results shown in FIG. 7, it is apparent that in the case where the additive amount of carbon was 0.05 mol (2 equivalents), a peak of magnesium sulfate was not detected, and only a peak of magnesium oxide was detected. That is, it was confirmed that magnesium sulfate obtained by concentration and separation was all converted into magnesium oxide, and thus roasting was sufficiently performed. The resulting magnesium oxide was analyzed by ICP, and found to have a magnesium grade of 55% by weight and a calcium grade of 5% by weight.

For the crystals of magnesium sulfate obtained by heating the solution to 80° C. using a water bath, and then holding the solution at 30° C., roasting was performed in the same manner as in the case of obtaining crystals of magnesium sulfate by natural drying except that carbon was added in an amount corresponding to 2 equivalents. As a result, the resulting magnesium oxide had a magnesium grade of 55% by weight and a calcium grade of 8% by weight.

From the above results, it has become apparent that by roasting magnesium sulfate using a carbon-based reducing agent in an amount of 2 equivalents or more, all the crystals can be roasted into magnesium oxide in a short time.

(Washing)

Next, 10 g of each of the magnesium oxides obtained by performing roasting with 2 equivalents of the reducing agent added to the magnesium sulfates obtained by natural drying and heating in a water bath as described above, respectively, was provided, and added in a 200 ml beaker. Subsequently, 120 ml of pure water was poured in the beaker, the mixture was stirred, and then left standing to soak the magnesium oxide, and the supernatant was then discharged to separate the floating unreacted reducing agent and ash after reaction. Using a filter paper and a filtration bottle, solid-liquid separation was performed to produce magnesium oxide. The resulting crystals of magnesium oxide were dried, and analyzed by ICP.

As a result, the magnesium grade in each magnesium oxide was 55% by weight, and identical to that before washing. On the other hand, the calcium grade considerably decreased from 5% before washing to 0.66% after washing for the magnesium oxide produced by roasting the magnesium sulfate obtained by natural drying. The calcium grade decreased from 8% before washing to 1.06% after washing for the magnesium oxide produced by roasting the magnesium sulfate obtained by heating in a water bath.

Thus, by performing the washing treatment, calcium remaining in crystals was reduced to produce magnesium oxide having a low impurity grade and a high purity.

Example 2

<Production of Magnesium Oxide from Sulfurized Solution in HPAL Process>

A 64 wt % sulfuric acid solution was added to and mixed with a nickel oxide ore having a nickel grade of 1% and an iron grade of 46 to 48%, in an amount of 275 Kg per 1 ton of the ore (275 [Kg/ore-t]), and the mixture was adjusted so as to form a slurry having a concentration of 30 to 40% by weight.

The mixed slurry was then introduced into a pressurizing apparatus, heated to 240 to 250° C. while being stirred, and then held for 3 hours, so that nickel in the ore was leached to form a leached slurry. Next, to the resulting leached slurry was added pure water in such a manner that the slurry had a volume equal to that before leaching.

Magnesium oxide having a sulfur grade of 0.66% after washing and obtained by natural drying in the process for producing magnesium oxide described above was added to the slurry to neutralize free sulfuric acid remaining in the leached slurry.

Then, using Nutsche and a filtration bottle, the leached slurry was directly solid-liquid-separated into a leachate and leached residue.

The pH of the resulting leachate was adjusted to precipitate impurities to provide a neutralized solution, and a sulfurizing agent was added to the neutralized solution to separate nickel and cobalt as a sulfide, thereby obtaining sulfurized waste water (sulfurized solution). As values measured by analysis of the sulfurized waste water, the content of manganese was 2.9 g/L, the content of magnesium was 7.8 g/L, the content of aluminum was 2.9 g/L, the content of iron was 0.4 g/L, and the pH of the waste water was 2.5.

Next, the sulfurized waste water was introduced into a reaction vessel, and kept at 60° C. while being stirred, and simultaneously a slaked lime slurry was added as a neutralizing agent to adjust pH to 4.5 to neutralize the sulfurized waste water, so that the aluminum component was precipitated and separated to perform solid-liquid separation. It was able to sufficiently remove aluminum to the extent that the concentration of aluminum in the filtrate as a neutralized solution was less than 0.01 g/L.

Further, from the resulting neutralized solution (discharge waste water), magnesium oxide was produced using the same natural drying (drying in the sun) process as in Example 1. Specifically, the discharge waste water was heated to be concentrated until the specific gravity reached about 1.25 g/cm$^3$, so that calcium was precipitated as crystals of calcium sulfate dihydrate. The concentrated waste water was filtered to recover a magnesium-rich filtrate. Further, the filtrate was left standing under the same meteorological conditions as in Example 1 for 1 month, and thus naturally dried to precipitate the magnesium component in the solution as crystals.

Next, the crystals of the magnesium salt were added in a crucible, pure graphite as a reducing agent was added to the crucible in an amount corresponding to 2 equivalents of the requirement for the reaction, and the crucible was heated to 1000° C. while air was blown into the crucible at a rate of 2.5 liters per minute. Thereafter, the crucible was held for 1 hour to be slowly cooled. In this way, magnesium oxide was obtained.

The resulting magnesium oxide was washed with water in the same manner as in Example 1, and resultantly high-purity magnesium oxide having a very low calcium grade of 0.7% was obtained.

<Production of Hematite Using High-Purity Magnesium Oxide>

Next, a 64 wt % sulfuric acid solution was added to and mixed with a nickel oxide ore having a nickel grade of 1% and an iron grade of 46 to 48%, in an amount of 275 Kg per 1 ton of the ore, the mixture was adjusted so as to form a slurry having a concentration of 30 to 40% by weight, and the slurry was introduced into a pressurizing apparatus, heated to 240 to 250° C., and then held for 3 hours to leach nickel in the ore, so that a leached slurry was formed. Pure water was added in such a manner that the leached slurry had a volume equal to that of the slurry before leaching.

As a neutralizing agent, high-purity magnesium oxide obtained by natural drying was added to the leached slurry to neutralize free sulfuric acid remaining in the leached slurry. After neutralization, the leached slurry was solid-liquid-separated into a leachate and leached residue (hematite) using Nutsche and a filter paper.

The results of analyzing the grades (% by weight) of iron, sulfur and calcium in leached residue (a) obtained in the manner described above are shown in Table 3 below. As shown in Table 3(a), it is apparent that the grade of each of sulfur and calcium in the resulting leached residue (a) was less than 0.1% by weight, and thus leached residue having a very low impurity grade was obtained. The grade of iron in the leached residue was 75% by weight in terms of hematite ($Fe_2O_3$), and thus leached residue having a very high hematite grade were obtained. The physical amount of the leached residue was as low as 94% whereas the physical amount of leached residue was 100% in the comparative example described later, so that it was able to save a site required for reclamation.

Thus, it has become apparent that when magnesium oxide is produced from a leachate of a nickel oxide ore by the above-mentioned process (using natural drying), and the magnesium oxide is used as a neutralizing agent for preliminary neutralization treatment of a leached slurry, hematite can be produced which has a low grade of impurities such as sulfur and calcium and which can be effectively used as an ironmaking raw material. It has become apparent that by using a process in which magnesium oxide produced in the manner described above is repeatedly used as a neutralizing agent, the amount of the neutralizing agent to be newly used can be reduced, and the amount of generation of residues to be deposited can also be reduced.

Comparative Example 1

As in Example 2, a 64 wt % sulfuric acid solution was added to and mixed with a nickel oxide ore having a nickel grade of 1% and an iron grade of 46 to 48%, in an amount of 275 Kg per 1 ton of the ore, the mixture was adjusted so as to form a slurry having a concentration of 30 to 40% by weight, and the slurry was introduced into a pressurizing apparatus, heated to 240 to 250° C., and then held for 3 hours to leach nickel in the ore, so that a leached slurry was formed. Pure water was added in such a manner that the leached slurry had a volume equal to that of the slurry before leaching.

As a neutralizing agent, slaked lime was added to the leached slurry to neutralize free sulfuric acid remaining in the leached slurry. After neutralization, the leached slurry was solid-liquid-separated into a leachate and leached residue (hematite) using Nutsche and a filter paper.

The results of analyzing the grades (% by weight) of iron, sulfur and calcium in leached residue (b) obtained in the manner described above are shown in Table 3 below. As shown in Table 3(b), it is apparent that the grade of each of sulfur and calcium in the resulting leached residue (b) was more than 1% by weight, and thus the leached residue had a very high impurity grade and were not suitable as an ironmaking raw material.

TABLE 3

| | Leached residue (physical amount) | $Fe_2O_3$ (grade (% by weight)) | Ca (grade (% by weight)) | S (grade (% by weight)) |
|---|---|---|---|---|
| Leached residue (a) [Example 2] | 94 | 75 | <0.1 | <0.1 |
| Leached residue (b) [Comparative Example 1] | 100 | 70 | 1.5 | 1.2 |

Example 3

As in the roasting step in Example 1, crystals of magnesium sulfate heptahydrate separated from a solution prepared in the same manner as in Example 1 were divided into two parts, and added in two crucibles, respectively. Charcoal having the composition shown in Table 4 was added to these crucibles as a reducing agent in an amount of 0.025 mol and an amount of 0.05 mol, respectively, in terms of a carbon content, and the crucibles were heated to 1000° C. while air was blown into the crucibles at a rate of 2.5 liters per minute. Thereafter, the crucibles were held for 1 hour to be slowly cooled. The additive amounts of charcoal were amounts corresponding, respectively, to 1 equivalent and 2 equivalents of the requirement for reaction.

TABLE 4

| Analysis items | |
|---|---|
| Water content (%) | 9.0 |
| Ash content (%) | 1.9 |
| Fixed carbon (%) | 94 |
| Calcium (%) | 1.0 |

TABLE 4-continued

| Analysis items | |
|---|---|
| Magnesium (%) | 0.3 |
| Manganese (%) | <0.1 |
| Iron oxide (%) | <0.1 |
| Potassium + Sodium (%) | 0.5 |
| Silicic acid (%) | <0.1 |
| Phosphoric acid (%) | 0.1 |
| Others (carbonic acid etc.) (%) | 0.1 |

After cooling, the crystals were taken out from the respective crucibles, and morphologically analyzed using an X-ray diffractometer (XRD).

In the case where the additive amount of charcoal was 0.025 mol (1 equivalent), a peak of magnesium sulfate similar to that in FIG. 6 was detected, and thus all the crystals of magnesium sulfate obtained by concentration and separation were not converted into magnesium oxide, as in Example 1. On the other hand, in the case where the additive amount of charcoal was 0.05 mol (2 equivalents), a peak of magnesium sulfate was not detected, and only a peak of magnesium oxide was detected as in FIG. 7. That is, it was confirmed that magnesium sulfate obtained by concentration and separation was all converted into magnesium oxide, and thus roasting was sufficiently performed.

From the above results, it has become apparent that even when charcoal is used as a reducing agent, all the crystals can be roasted into magnesium oxide in a short time by roasting magnesium sulfate with an amount of carbon, which corresponds to 2 equivalents or more.

The invention claimed is:

1. A process for producing hematite comprising
    (a) preparing a slurry wherein a sulfuric acid solution is added to a nickel oxide ore that contains cobalt and other metals,
    (b) leaching nickel and cobalt in the slurry at a high temperature and high pressure,
    (c) adding magnesium oxide as a first neutralizing agent to the slurry to adjust pH,
    (d) separating the slurry into a leachate containing nickel and cobalt and leached residue as hematite,
    (e) recovering the hematite,
    (f) adding a second neutralizing agent to the leachate to separate impurities, and adding a sulfurizing agent to the resulting neutralized solution to obtain a sulfurized solution and sulfides of nickel and cobalt, and separating the sulfurized solution,
    (g) adding a third neutralizing agent to the sulfurized solution to separate aluminum and manganese from the sulfurized solution and then concentrating the sulfurized solution to an end point at which the specific gravity of the concentrated sulfurized solution reaches 1.1 to 1.3 g/cm$^3$, thereby to precipitate and separate calcium as calcium sulfate and produce a separated solution,
    (h) crystallizing magnesium sulfate from the separated solution of step (g) and separating the magnesium sulfate,
    (i) roasting the magnesium sulfate with a reducing agent producing magnesium oxide and a sulfurous acid gas, and
    (j) washing the magnesium oxide from step (i), and recycling the magnesium oxide as an addition to the first neutralization agent in step (c).

2. The process for producing hematite according to claim 1, wherein the end point of concentration of the sulfurized solution in step (g) is a point at which the specific gravity of the concentrated solution reaches 1.25 g/cm$^3$.

3. The process for producing hematite according to claim 1, wherein concentration of the solution in step (g) and in step (h) is performed by natural drying.

4. The process for producing hematite according to claim 1, wherein the sulfurized solution is a filtrate obtained by adding the third neutralizing agent to the sulfurized solution to adjust pH to 7.0 to 8.5, and then performing solid-liquid separation.

5. The process for producing hematite according to claim 1, wherein at least one of coke, coal, charcoal, bamboo charcoal and waste activated carbon is used in step (i).

6. The process for producing hematite according to claim 1, wherein the sulfurous acid gas generated in step (i) is transformed into sulfuric acid and the resulting sulfuric acid is used for the leaching of the nickel oxide ore at a high temperature and high pressure repeatedly.

7. The process for producing hematite according to claim 1, wherein the crystals of magnesium sulfate obtained in step (h) are dissolved by adding water thereto and the resulting solution is concentrated again in the magnesium crystallization step repeatedly.

8. The process for producing hematite according to claim 1, wherein hematite has a sulfur grade of less than 1% by weight and a calcium grade of less than 1% by weight, and is used as an ironmaking raw material.

* * * * *